United States Patent
Kim et al.

(10) Patent No.: US 10,182,353 B2
(45) Date of Patent: Jan. 15, 2019

(54) METHOD AND APPARATUS FOR TRANSMITTING/RECEIVING PHYSICAL CHANNELS IN COMMUNICATION SYSTEM SUPPORTING CARRIER AGGREGATION

(71) Applicant: Samsung Electronics Co., Ltd., Gyeonggi-do (KR)

(72) Inventors: Youngbum Kim, Seoul (KR); Juho Lee, Gyeonggi-do (KR); Joonyoung Cho, Gyeonggi-do (KR); Hyoungju Ji, Seoul (KR); Younsun Kim, Gyeonggi-do (KR); Sangmin Ro, Seoul (KR); Seunghoon Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 817 days.

(21) Appl. No.: 13/907,081

(22) Filed: May 31, 2013

(65) Prior Publication Data
US 2013/0322372 A1    Dec. 5, 2013

(30) Foreign Application Priority Data

May 31, 2012 (KR) .................. 10-2012-0058686

(51) Int. Cl.
*H04W 16/14* (2009.01)
*H04L 5/00* (2006.01)
(Continued)

(52) U.S. Cl.
CPC ............. *H04W 16/14* (2013.01); *H04L 5/001* (2013.01); *H04L 5/0035* (2013.01);
(Continued)

(58) Field of Classification Search
CPC ... H04W 52/146; H04W 52/34; H04W 52/16; H04W 52/365; H04W 52/367;
(Continued)

(56) References Cited

U.S. PATENT DOCUMENTS 5,978,657 A * 11/1999 Suzuki .................. H04W 52/24
455/522
9,560,615 B2    1/2017 Kim et al.
(Continued)

FOREIGN PATENT DOCUMENTS

CN    102165716    8/2011
EP    2 385 651    11/2011
(Continued)

OTHER PUBLICATIONS

NEC, "Component Carrier Configuration/Activation for Carrier Aggregation", R2-093697, 3GPP TSG RAN2 Meeting #66bis, Jun. 29-Jul. 3, 2009.
(Continued)

*Primary Examiner* — Natasha W Cosme
(74) *Attorney, Agent, or Firm* — The Farrell Law Firm, P.C.

(57) ABSTRACT

A physical channel transmission method using inter-eNB carrier aggregation is provided for improvement of peak data rate and system throughput in a wireless communication system. The physical channel transmission method of a terminal in a communication system supporting carrier aggregation includes receiving carrier aggregation configuration information from a network; aggregating a plurality of carriers according to the carrier aggregation configuration information; and transmitting an uplink control channel on a common uplink frequency on which a plurality of base stations join the carrier aggregation.

14 Claims, 8 Drawing Sheets

(51) Int. Cl.
*H04W 52/32* (2009.01)
*H04W 52/14* (2009.01)
*H04W 52/24* (2009.01)
*H04W 52/34* (2009.01)

(52) U.S. Cl.
CPC ......... *H04W 52/325* (2013.01); *H04L 5/0091* (2013.01); *H04W 52/146* (2013.01); *H04W 52/244* (2013.01); *H04W 52/346* (2013.01)

(58) Field of Classification Search
CPC . H04W 52/325; H04W 52/346; H04W 4/023; H04W 52/10; H04W 52/243; H04W 72/02; H04W 72/0413; H04W 72/048; H04W 72/1268; H04W 74/00; H04W 92/20; H04W 52/281
USPC .......... 370/329; 455/522, 54.2, 56.1, 63, 69, 455/422.1
See application file for complete search history.

(56) References Cited

U.S. PATENT DOCUMENTS

| | | | |
|---|---|---|---|
| 2008/0316969 A1 | 12/2008 | Prakash et al. | |
| 2010/0271970 A1* | 10/2010 | Pan | H04L 1/0026 370/252 |
| 2011/0275403 A1* | 11/2011 | Chen | H04W 52/146 455/522 |
| 2011/0312316 A1* | 12/2011 | Baldemair | H04L 5/001 455/422.1 |
| 2012/0113831 A1 | 5/2012 | Pelletier et al. | |
| 2012/0213189 A1* | 8/2012 | Choi | H04W 72/1231 370/329 |
| 2013/0114472 A1* | 5/2013 | Tamaki | H04L 1/1854 370/280 |
| 2013/0176953 A1* | 7/2013 | Stern-Berkowitz | H04W 52/146 370/329 |
| 2013/0279433 A1* | 10/2013 | Dinan | H04W 56/0005 370/329 |

FOREIGN PATENT DOCUMENTS

| | | |
|---|---|---|
| KR | 1020100036247 | 4/2010 |
| WO | WO 2011/100673 | 8/2011 |

OTHER PUBLICATIONS

Fujitsu, "Consideration on PUCCH Transmission Enhancement", R1-122082, 3GPP TSG-RAN WG1#69, May 21-25, 2012.
Huawei, "Consideration of DCI 3/3A for Carrier Aggregation", R1-101052, 3GPP TSG RAN WG1 Meeting #60, Feb. 22-26, 2010.
HTC, "Cross Carrier Power Control with DCI Format 3/3A", R1-102733, 3GPP TSG-RAN WG1 #61, May 10-14, 2010.
Ericsson, "Introduction of CA Enhancements in MAC", R2-123091, 3GPP TSG-RAN2 Meeting #78, May 21-25, 2012.
Nokia Siemens Networks, Nokia, "Cell Aggregation: A Unified Approach to CoMP and Carrier Aggregation", R1-112390, 3GPP TSG-RAN WG1 Meeting #66, Aug. 22-26, 2011, 7 pages.
Chinese Office Action dated Jan. 16, 2017 issued in counterpart application No. 201380027817.1, 9 pages.
European Search Report dated Dec. 5, 2016 issued in counterpart application No. 13170041.1-1857, 11 pages.
NTT Docomo, "Discussion on 1CC Transmission in a TTI for Uplink Inter-Band Carrier Aggregation", R4-121559, 3GPP TSG RAN WG4 Meeting #62bis, Mar. 26-30, 2012, 4 pages.
Japanese Office Action dated Apr. 3, 2017 issued in counterpart application No. 2015-514909, 7 pages.
Korean Office Action dated Sep. 20, 2018 issued in counterpart application No. 10-2012-0058686, 6 pages.

* cited by examiner

METHOD AND APPARATUS FOR TRANSMITTING/RECEIVING PHYSICAL CHANNELS IN COMMUNICATION SYSTEM SUPPORTING CARRIER AGGREGATION

PRIORITY

This application claims priority under 35 U.S.C. § 119(a) to a Korean patent application filed on May 31, 2012 in the Korean Intellectual Property Office and assigned Serial No. 10-2012-0058686, the entire content of which is incorporated herein by reference.

BACKGROUND OF THE INVENTION

1. Field of the Invention

The present invention generally relates to a wireless communication system and, more particularly, to a physical channel transmission/reception method between a base station and a terminal using inter-eNB carrier aggregation in a wireless communication system.

2. Description of the Related Art

Wireless communication systems have evolved into high-speed, high-quality wireless packet data communication systems to provide data and multimedia services beyond the early voice-oriented services. Recently, various mobile communication standards, such as High Speed Downlink Packet Access (HSDPA), High Speed Uplink Packet Access (HSUPA), Long Term Evolution (LTE), and LTE-Advanced (LTE-A) defined in $3^{rd}$ Generation Partnership Project (3GPP), High Rate Packet Data (HRPD) defined in $3^{rd}$ Generation Partnership Project-2 (3GPP2), and 802.16 defined in IEEE, have been developed to support high-speed, high-quality wireless packet data communication services.

As a representative broadband wireless communication standard, LTE adopts Orthogonal Frequency Division Multiple Access (OFDMA) in the downlink and Single Carrier Frequency Division Multiple Access (SC-FDMA) in the uplink. In such multiple access schemes, the user-specific data and/or control information are mapped to time-frequency resources without overlapping each other, i.e. maintaining orthogonality, to identify the user-specific data and/or control information.

The LTE system adopts Hybrid Automatic Repeat reQuest (HARQ) for retransmitting the data that has failed in decoding in the physical layer. HARQ is a technique for ensuring reliability of data transmission in such a way that a receiver transmits a Negative Acknowledgement (NACK) to a transmitter to request for retransmission of the data that has failed in decoding in the physical layer. The receiver combines the retransmitted data with the previously transmitted data to increase data reception performance. If the data are decoded successfully, the receiver transmits an ACK to the transmitter, such that the transmitter transmits next data.

In a broadband wireless communication system, one of the significant factors to provide high-speed wireless data service is bandwidth scalability for dynamic resource allocation. For example, the Long Term Evolution (LTE) system can support the bandwidths of 20/15/10/5/3/1.4 MHz. The carriers can provide services with at least one of the bandwidths, and the user equipment can have different capabilities such that some support only 1.4 MHz bandwidth and others up to 20 MHz bandwidth.

The LTE-Advanced (LTE-A) system, aiming at achieving the requirements of the IMT-Advanced service, can provide broadband service by aggregating carriers up to 100 MHz.

The LTE-A system needs the bandwidth to be wider than that of LTE system for high-speed data transmission. Simultaneously, the LTE-A system needs to be backward compatible with the LTE system such that LTE User Equipments (UEs) can access the services of the LTE-Advanced system. For this purpose, the entire system bandwidth of the LTE-A system is divided into sub-bands or component carriers that have a bandwidth supporting transmission or reception of the LTE UE and can be aggregated for supporting the high speed data transmission of the LTE-A system in the transmission/reception process of the legacy LTE system per component carrier.

FIG. 1 illustrates the configuration of a radio access network of a conventional LTE-A system capable of carrier aggregation.

FIG. 1 shows an evolved Node B (eNB) supporting aggregation of two component carriers (CC#1 and CC#2) having the center frequencies of f1 and f2 respectively. CC#1 and CC#2 belong to the same eNB 102. The eNB 102 has coverage areas 104 and 106 corresponding to the respective component carriers. In the LTE-A system capable of carrier aggregation, the data and control information for data communication are transmitted on the respective component carriers. The network configuration of FIG. 1 can be applicable for uplink component carrier aggregation as well as downlink component carrier aggregation.

However, the conventional LTE-A system is restricted to intra-eNB carrier aggregation. The present invention provides an inter-eNB carrier aggregation method, as discussed below.

SUMMARY

The present invention has been made to address at least the above mentioned problems and disadvantages and to provide at least the advantages described below. Accordingly, an aspect of the present invention provides a method for transmitting/receiving physical data and control channels using inter-eNB carrier aggregation in a broadband wireless communication system.

In accordance with an aspect of the present invention, a physical channel transmission method of a terminal in a communication system supporting carrier aggregation includes receiving carrier aggregation configuration information from a network; aggregating a plurality of carriers according to the carrier aggregation configuration information; and transmitting an uplink control channel on a common uplink frequency on which a plurality of base stations join the carrier aggregation.

In accordance with another aspect of the present invention, a physical channel reception method of a base station in a communication system supporting carrier aggregation includes establishing a connection with a terminal which requests an initial attach procedure; transmitting carrier aggregation configuration information to the terminal; and receiving an uplink control channel from the terminal through a common uplink frequency of a plurality of base stations according to the carrier aggregation configuration information.

In accordance with another aspect of the present invention, a terminal for transmitting a physical channel in a communication system supporting carrier aggregation includes a transceiver which transmits and receives signals and data to and from a network; and a controller which controls an initial attach procedure to the network, receiving carrier aggregation configuration information from the network, aggregating a plurality of carriers according to the carrier aggregation configuration information, and transmitting an uplink control channel on a common uplink frequency on which a plurality of base stations join the carrier aggregation.

In accordance with still another aspect of the present invention, a base station for receiving a physical channel in a communication system supporting carrier aggregation includes a transceiver which transmits and receives signals and data to and from a terminal; and a controller which controls establishing a connection with a terminal which requests an initial attach procedure, transmitting carrier aggregation configuration information to the terminal, and receiving an uplink control channel from the terminal through a common uplink frequency of a plurality of base stations according to the carrier aggregation configuration information.

BRIEF DESCRIPTION OF THE DRAWINGS

The aspects, features and advantages of the present invention will be more apparent from the following detailed description in conjunction with the accompanying drawings, in which.

DETAILED DESCRIPTION OF EMBODIMENTS OF THE PRESENT INVENTION

Embodiments of the present invention are described with reference to the accompanying drawings in detail. The same reference numbers are used throughout the drawings to refer to the same or like parts. Detailed description of well-known functions and structures incorporated herein may be omitted to avoid obscuring the subject matter of the present invention.

In the following description, the term 'base station' refers to an entity for allocating resources to terminals and can be any of an eNode B, eNB, Node B, BS, radio access unit, base station controller, or network.

In the following description, a "terminal" can be any of a User Equipment (UE), Mobile Station (MS), cellular phone, smartphone, computer, and multimedia system capable of communication.

Although the following description is directed to an E-UTRA (or LTE-A) system, it will be understood by those skilled in the art that the present invention can be applied to other communication systems having similar technical backgrounds and channel formats, with slight modification, without departing from the spirit and scope of the present invention. For example, the transmission/reception method of the present invention can be applied to a multicarrier HSPA system supporting carrier aggregation.

Although the following description is directed to carrier aggregation between macro and pico eNBs, the present invention is not limited thereto but can be applied for carrier aggregation between geographically-remote eNBs. For example, the present invention can be applied to carrier aggregation between two geographically-remote macro eNBs and between two geographically-remote pico eNBs. Also, there is no limit in the number of carriers to be aggregated.

The present invention provides a physical data and control channel transmission/reception method through broad bandwidth achieved through inter-eNB carrier aggregation in an LTE-A system.

The present invention provides a physical channel transmission method and apparatus that is capable of transmitting physical data and control information using inter-eNB carrier aggregation in a wireless communication system, resulting in improvement of peak data rate and system throughput.

Figure 1:
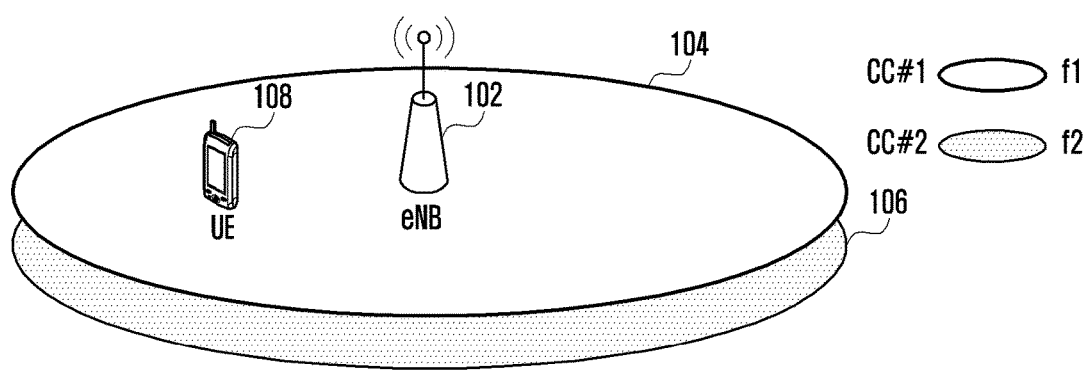
FIG. 1 illustrates the configuration of a radio access network of a conventional LTE-A system capable of carrier aggregation.
Figure 2:
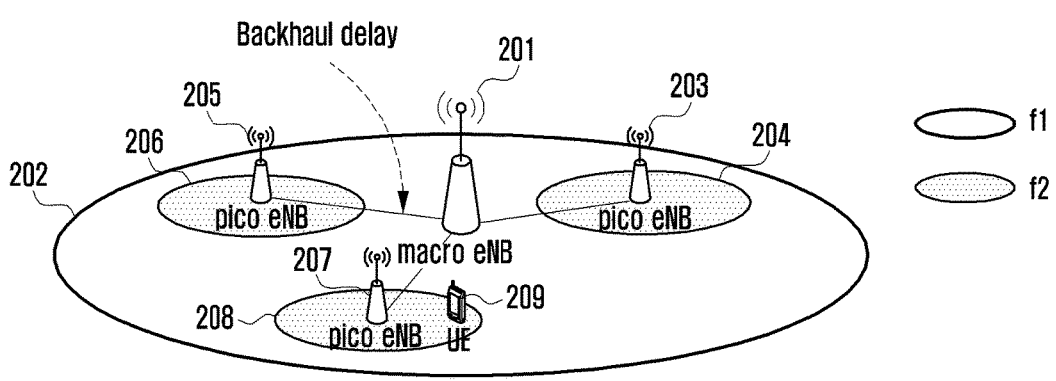
FIG. 2 illustrates a broadband LTE-A system supporting inter-eNB carrier aggregation according to a first embodiment of the present invention.

FIG. 2 illustrates a broadband LTE-A system supporting inter-eNB carrier aggregation according to an embodiment of the present invention.

FIG. 2 shows a system in which plural pico eNBs 203, 205, and 207 having small coverage areas are distributed within the coverage area 202 of a macro eNB 201. Typically, a macro eNB transmits signals at a power level higher than that of a pico eNB. The macro eNB 201 and the pico eNBs 203, 205, and 207 are connected each other with a certain amount of backhaul delay. Accordingly, it is preferred not to exchange delay-sensitive information between macro and pico eNBs.

The embodiment of FIG. 2 is directed to the case where the macro eNB 201 uses frequency f1 for downlink signal transmission, and the pico eNBs 203, 2-5 and 207 use frequency f2 for downlink transmission. The macro eNB 201 transmits data or control information to the UE 209 through frequency f1, and the pico eNB 207 transmits data or control information to the UE 209 through frequency f2. Through carrier aggregation, multiple eNBs can transmit signals to the UE simultaneously through different frequency, resulting in improvement of peak data rate and system CARRIER AGGREGATION configuration information.

The network configuration of FIG. 2 can be applied to uplink carrier aggregation as well as downlink carrier aggregation. For example, the UE 209 may transmit data or control information to the macro eNB 201 through frequency f1 and to the pico eNBs 203, 205 and 207 through frequency f2.

As described herein, a carrier aggregation system is composed of a Primary Cell (PCell) and a Secondary Cell (SCell). The PCell allocates radio resources to the UE and acts as an anchor for initial access and handover of the UE. The PCell corresponds to a downlink primary frequency (or Primary Component Carrier (PCC)). The SCell allocates supplementary radio resources to the UE in cooperation with the PCell and corresponds to a downlink secondary frequency (or Secondary Component Carrier (SCC)) and uplink secondary frequency. The HARQ ACK/NACK and Channel Status Indicator (CSI) feedback is transmitted from the UE to the eNB on a Physical Uplink Control CHannel (PUCCH).

Figure 3:
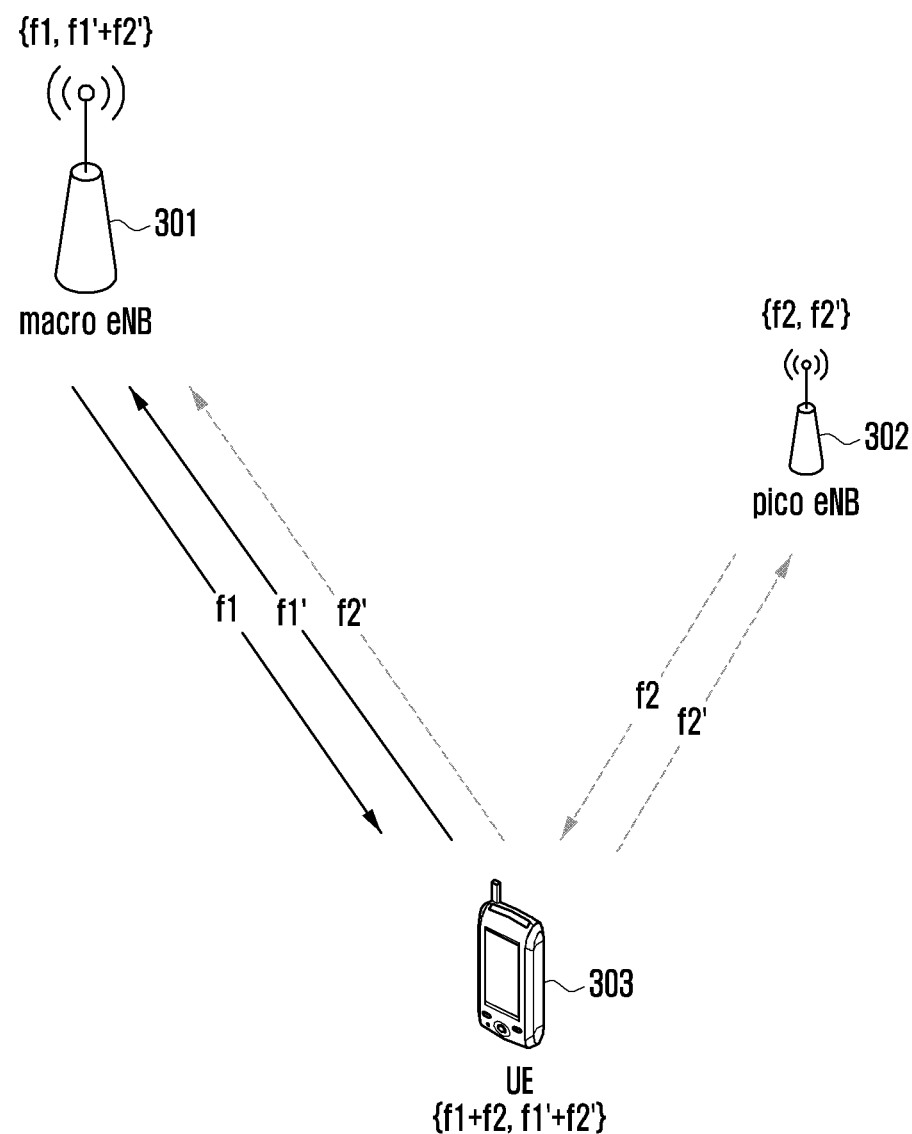
FIG. 3 illustrates the inter-eNB carrier aggregation mechanism of the LTE-A system according to the first embodiment of the present invention.

FIG. 3 illustrates the inter-eNB carrier aggregation mechanism of the LTE-A system according to a first embodiment of the present invention.

FIG. 3 includes a macro eNB 301 operating on a downlink frequency f1 and an uplink frequency f1' and a pico eNB 302 operating on a downlink frequency f2 and an uplink frequency f2' that are located at different positions. The macro eNB 301 is capable of receiving and processing the uplink signal transmitted on the uplink frequency f2'.

The macro eNB 301 and pico eNB 302 are connected to each other through a backhaul having a certain amount of delay. Accordingly, it is preferred not to exchange any delay-sensitive information between the macro and pico eNBs.

In the system configured as shown in FIG. 3, the UE 303 is capable of receiving and processing signals on the downlink frequencies f1 and f2 and transmitting and processing signals on the uplink frequencies f1' and f2'.

If the UE transmits Uplink Control Information (UCI) such as HARQ ACK/NACK and CSI on the PUCCH, it is necessary to configure the PUCCH as a narrow band signal for carrying UCI having a relatively small amount of information and transmit the UCI at a high transmit power level for high reception performance. If the UE transmits the narrowband signals at high transmit power levels on f1' and f2', this causes interference between the signals and to the neighbor systems and consumes a large amount of battery power. Accordingly, it is preferred for the UE to avoid simultaneously transmitting UCIs on the uplink frequencies f1' and f2'.

In the case of data transmission, however, the UE is capable of transmitting data at a relatively low transmit power level on the relatively broad bandwidth, and thus the interference probability is low. Accordingly, it does not cause any significant problem for the UE to simultaneously transmit data on f1' and f2' at a certain instant.

In the system configured as shown in FIG. 3, the UE transmits the PUCCH on the uplink frequency f2'. The PUCCH may carry at least one of a UCI addressed to the macro eNB 301 and a UCI addressed to the pico eNB 302. Since both the macro and pico eNBs are capable of receiving and processing the signals on the uplink f2', it is possible to receive the PUCCH transmitted on f2'.

Although it supports carrier aggregation, the UE has to attempt an initial attach procedure to the system on a single carrier. Once the initial attach procedure has been completed, the eNB checks the carrier aggregation capability of the UE and configures carrier aggregation to the UE. If the eNB configures carrier aggregation to the UE, it sends the UE at least one of the following informations through higher layer signaling. The eNB is also capable of sending to other eNBs participating in the carrier aggregation the control information including some or all of the following information through inter-eNB signaling.

First Information: This is the information on the SCell as a target of the carrier aggregation and includes downlink and uplink frequency information of the SCell.

Second Information: This is the information on the uplink frequency to be used by the UE for PUCCH transmission.

Third Information: This is the PUCCH transmission format for use in UCI transmission and may be one of PUCCH formats 1a, 1b, 2, and 3 defined in LTE-A standard or a new PUCCH format.

Fourth Information: This is PUCCH resource information necessary for the UE to acquire resource block information, orthogonal sequence information, and cyclic shift information directly or indirectly.

Figure 4:
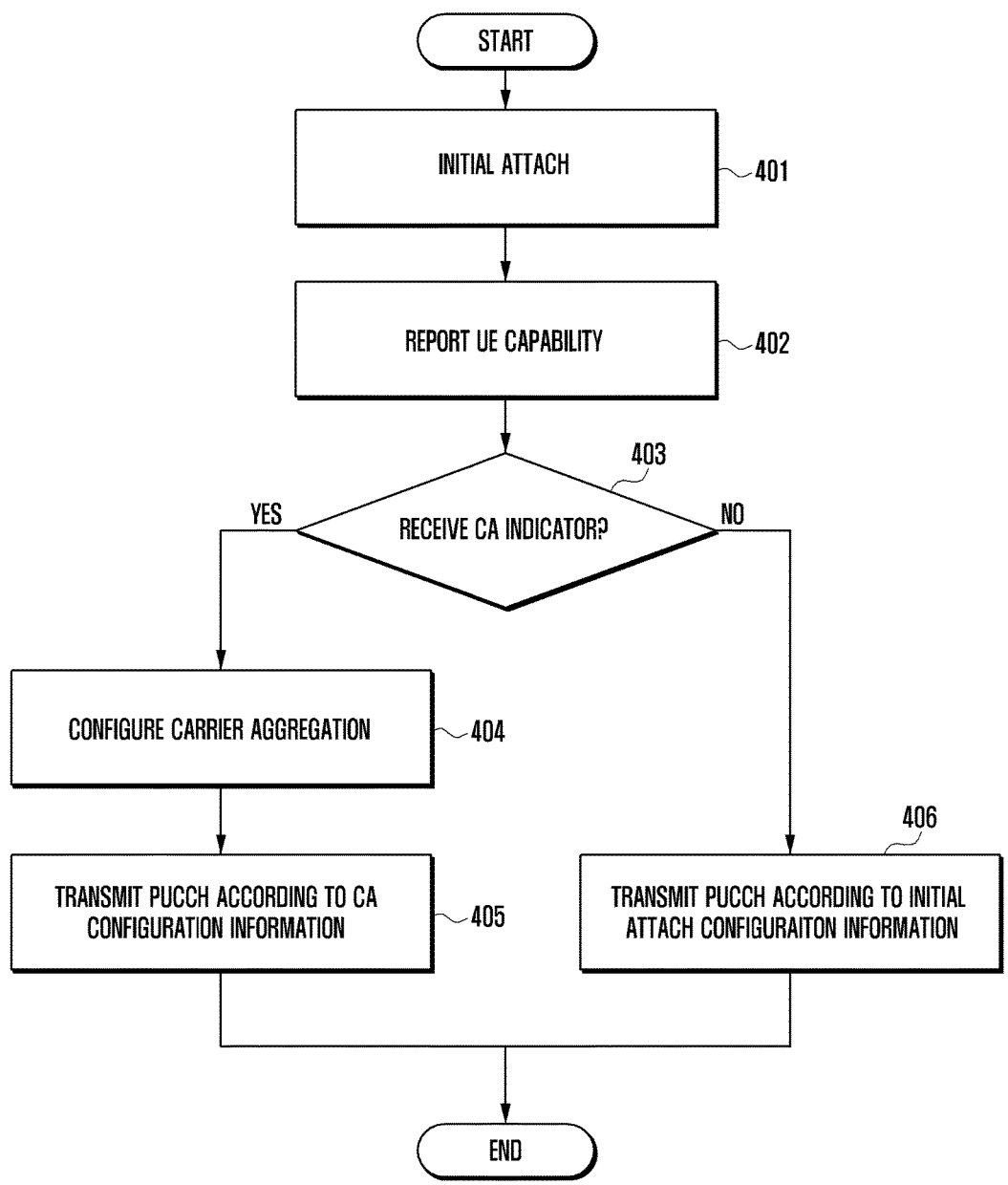
FIG. 4 is a flowchart illustrating a UCI feedback method of the UE according to the first embodiment of the present invention

FIG. 4 is a flowchart illustrating the UCI feedback method of the UE according to the first embodiment of the present invention. FIG. 4 shows the UE procedure of attaching the eNB and feeding back the UCI on the PUCCH according to whether carrier aggregation is supported.

First, the UE performs the initial attach procedure to the LTE-A system at step 401. The initial attach procedure is performed through a Random Access procedure. Once the initial attach procedure has been completed, the eNB and the UE are capable of communicating data under the control of the eNB. The UE reports the UE capability to the eNB at step 402. The UE capability indicates the LTE-A functions supported by the UE, particularly whether the UE supports carrier aggregation.

The eNB determines whether the UE can support carrier aggregation based on the UE capability. If it is determined that the UE can support carrier aggregation, the eNB transmits carrier aggregation configuration information including at least one of the first to fourth information to the UE.

The UE determines whether the carrier aggregation configuration information is received at step 403 and, if the carrier aggregation configuration information is received, the UE configures carrier aggregation based on the carrier aggregation configuration at step 404. Afterward, the UE is capable of communicating data and control information with the eNB through the downlink and uplink frequencies configured in the initial attach procedure and the downlink and uplink frequencies configured through carrier aggregation.

Next, the UE transmits, when there is UCI to be fed back to the eNB, the PUCCH on the uplink frequency indicated in the carrier aggregation configuration information at step 405.

If carrier aggregation configuration information is not received at step 403, the UE communicates data and control information with the eNB through the downlink and uplink frequencies configured in the initial attach procedure. Afterward, when there is UCI to be fed back to the eNB, the UE transmits the PUCCH carrying the UCI on the uplink frequency configured in the initial attach procedure at step 406.

When it is necessary to transmit the PUCCH carrying UCI, the UE operating in the carrier aggregation mode adjusts the transmit power according to the eNB to which the UCI is addressed. Typically, since the macro eNB 301 has a large coverage area, the distance between the UE 303 and the macro eNB 301 is relatively far away. Also, in the case of transmitting the control information requiring high reception probability, the UE has to transmit the signal at a relatively high transmit power level.

In contrast, since the pico eNB 302 has a relatively small coverage area, the distance between the UE 303 and the pico eNB 302 is relatively close such that the UE is capable of transmitting the signal to the pico cell at a relatively low transmit power level. Accordingly, in the case where the UE transmits the PUCCH carrying UCI on the uplink frequency f2' as shown in FIG. 3, if the PUCCH carries UCI addressed at least to the macro eNB 301, the UE 303 transmits the PUCCH at the transmit power level configured based on the power control information of the macro eNB 301. Otherwise, if the PUCCH carries only the UCI addressed to the pico cell but not the macro cell, the UE 303 transmits the PUCCH at the transmit power level configured based on the transmit power control information on the pico eNB 302.

Figure 5:
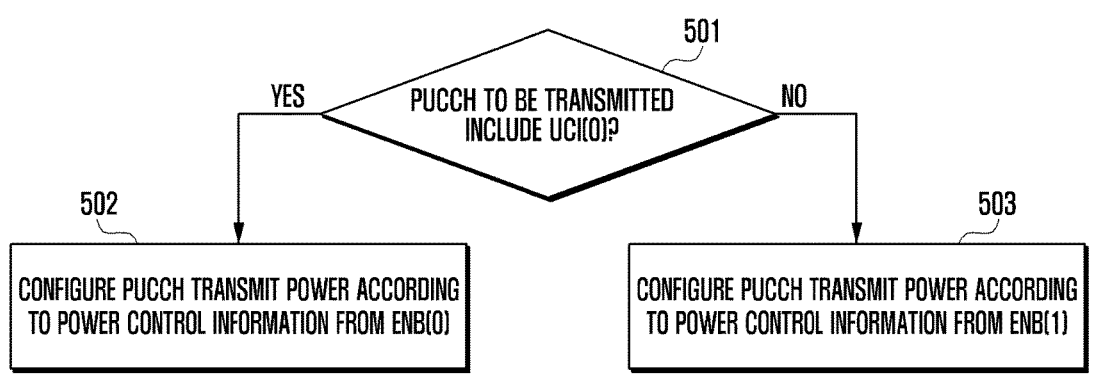
FIG. 5 is a flowchart illustrating a PUCCH transmission power control procedure of the method according to a second embodiment of the present invention.

FIG. 5 is a flowchart illustrating the PUCCH transmission power control procedure of the method according to an embodiment of the present invention.

Referring to FIG. 5, the PUCCH transmit power control procedure of the UE can be generalized as follows. If it is required to transmit the PUCCH carrying UCI, the UE determines whether the PUCCH includes UCI(0) at step 501. Here, UCI(0) denotes the UCI addressed to the eNB(0), and UCI(1) denotes the UCI addressed to the eNB (1). The eNB notifies the UE of the eNB(0) and eNB(1) among the eNBs joined in the carrier aggregation in advance. Also, it is possible for the eNB to send the UE the information on the PUCCH transmit power control depending on the UCI carried in the PUCCH. For example, the macro eNB may be configured as eNB(0) and the pico eNB may be configured as eNB(1). The UE is capable of adjusting the PUCCH transmit power according to the presence of UCI(0) in the PUCCH to be transmitted.

If it is determined at step 501 that UCI(0) is included in the PUCCH to be transmitted, the UE transmits the PUCCH at the transmit power level adjusted according to the power control information received from the eNB(0) at step 502. Otherwise, if it is determined at step 501 that UCI(0) is not included in the PUCCH, the UE transmits the PUCCH at the transmit power level adjusted according to the power control information received from the eNB(1). The power control information of each eNB may include Transmit Power Control (TPC) information, power control information in consideration of intra-cell interference, and pathloss information between the eNB and the UE.

The second embodiment of the present invention is identical with the first embodiment in system configuration as shown in FIG. 3 with the exception that the uplink carrier aggregation is not supported. That is, when it is required to transmit uplink data or control information at a certain time, the UE is capable of performing uplink transmission only on one uplink frequency. Referring to FIG. 3, the UE operates on the downlink frequencies f1 and f2 and only one of the uplink frequencies f1' and f2' at a certain instant.

Figure 6:
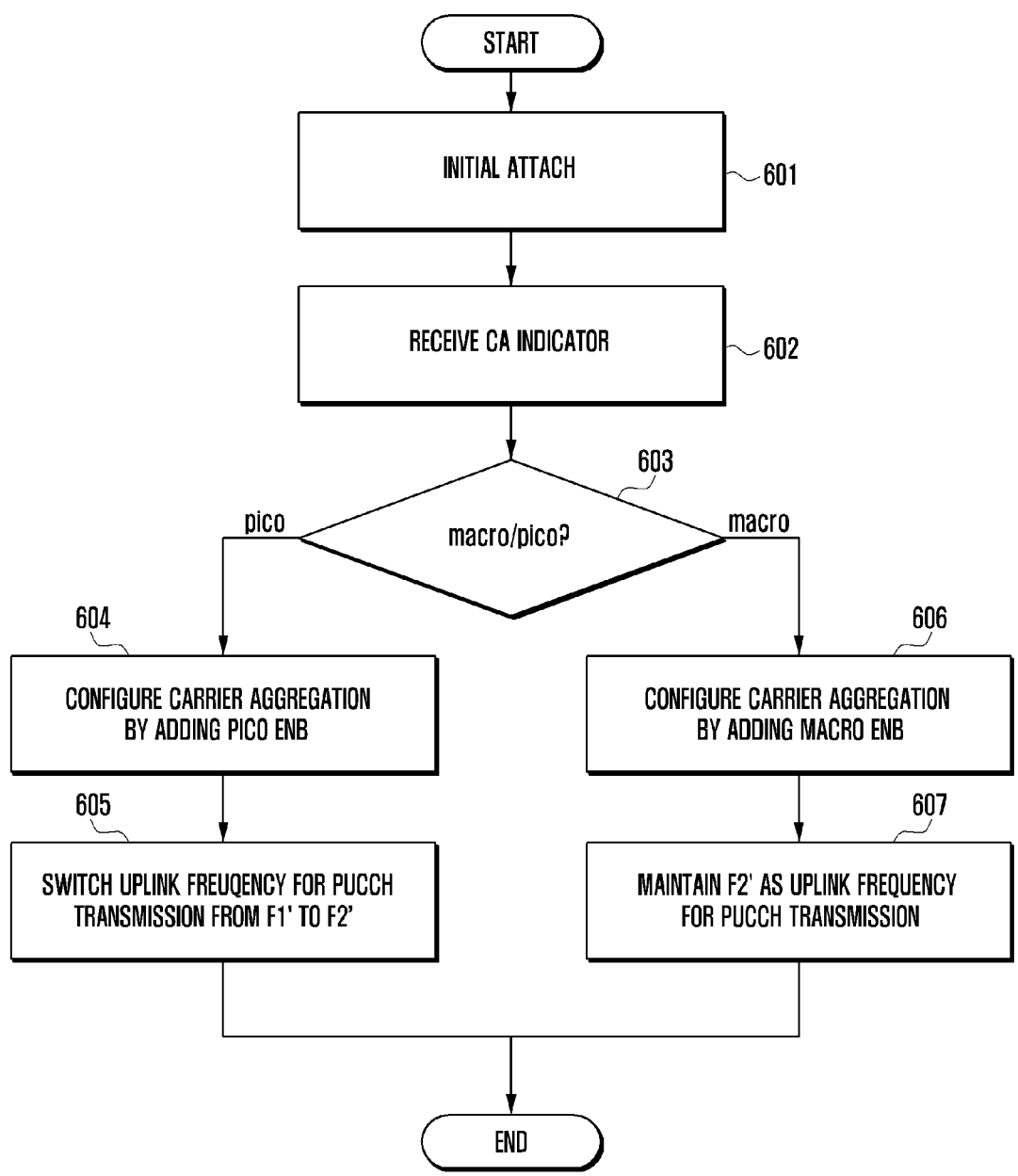
FIG. 6 is a flowchart illustrating a UCI feedback method of the UE according to the second embodiment of the present invention.

FIG. 6 is a flowchart illustrating the UCI feedback method of the UE according to the second embodiment of the present invention. FIG. 6 shows the UE procedure for UCI feedback on the PUCCH in the system configured as shown in FIG. 3.

First, the UE performs the initial attach procedure to the LTE-A system at step S601. The initial attach procedure is performed through a Random Access procedure. Once the initial attach procedure has been completed, the eNB and the UE are capable of communication data under the control of the eNB.

The eNB determines whether the UE supports carrier aggregation based on the UE capability to configure carrier aggregation for the UE. In the system of FIG. 3, if the initially-attached eNB is a pico eNB 302 and if the pico eNB 302 determines to join the downlink carrier aggregation with the macro eNB 301, the pico eNB 302 notifies the UE 303 of this determination through higher layer signaling. Otherwise, if the initially-attached eNB is the macro eNB 301 and if the macro eNB 301 determines the downlink carrier aggregation with any pico eNB, the macro eNB 301 notifies the UE 303 of this determination through higher layer signaling. In the second embodiment of the present invention, the eNB is capable of transmitting the carrier aggregation configuration information including at least the four aforementioned control information to the UE.

The UE receives the carrier aggregation configuration information at step 602 and determines whether the eNB indicated by the carrier aggregation configuration information is a macro eNB or a pico eNB at step 603.

If it is determined, at step 603, that the eNB indicated by the CA configuration information is the pico eNB, the UE configures downlink carrier aggregation joining the pico eNB at step 604.

Afterward, the pico and macro eNBs are capable of perform downlink data and control information transmission to the UE on the downlink frequency f1 configured in the initial attach procedure and the downlink frequency f2 configured in the carrier aggregation procedure. In this case, the uplink data and control information are transmitted to the pico eNB on the uplink frequency f2'.

If it becomes necessary to send UCI to the eNB, the UE transmits the PUCCH carrying UCI on the uplink frequency f2' corresponding to the pico eNB which is configured in the carrier aggregation procedure other than the uplink frequency f1' configured in the initial attach procedure.

The uplink signal transmission of the UE is performed on the uplink frequency f2' on which both the macro and pico eNBs are capable of receiving uplink signals such that the macro and pico eNBs receive the UCIs addressed thereto, respectively.

If it is determined, at step 603, that the eNB indicated by the CA configuration information is the macro eNB, the UE configures downlink carrier aggregation joining the macro eNB at step 606.

Afterward, both the pico and macro eNBs joined in the carrier aggregation transmit data and control information on the downlink frequency f2 configured in the initial attach procedure and downlink frequency f1 configured in the carrier aggregation procedure, and the UE transmits data and control information on the uplink frequency f2' configured in the initial attach procedure.

Afterward, if it becomes necessary to send UCI to the eNB, the UE transmits the PUCCH carrying UCI to the eNB on the uplink frequency f2' configured in the initial attach procedure at step 607.

Figure 7:
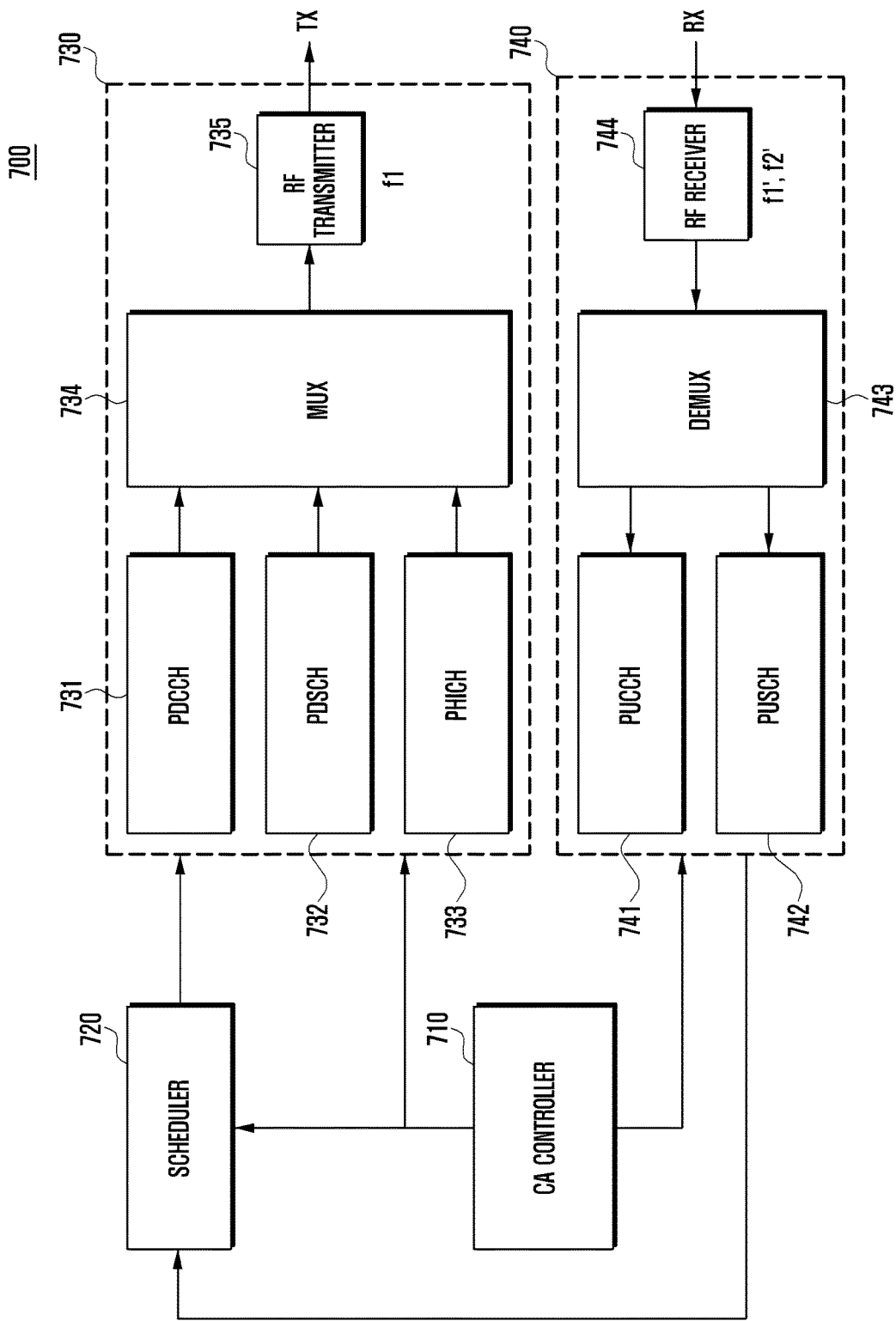
FIG. 7 is a block diagram illustrating the configuration of an eNB according to an embodiment of the present invention.

FIG. 7 is a block diagram illustrating the configuration of the eNB according to an embodiment of the present invention. Referring to FIG. 7, the eNB 700 includes a CA controller 710; a scheduler 720; a transmission unit 730 including a PDCCH generator 731, a PDSCH generator 732, a PHICH generator 733, a multiplexer 734, and an RF transmitter 735; and a reception unit 740 including a PUCCH receiver 741, a PUSCH receiver 742, a demultiplexer 743, and an RF receiver 744.

The CA controller 710 determines carrier aggregation to the UE to be scheduled based on the amount of data to be transmitted to the UE and the resource amount available within the system, and notifies the scheduler 720 and the function blocks of the transmission unit 730 and the reception unit 740.

The PDCCH generator 731 generates a Physical Downlink Control CHannel (PDCCH) through channel coding and modulation on the downlink control information including scheduling information under the control of the scheduler 720 and the CA controller 710. The PDSCH generator 732 generates a Physical Downlink Shared CHannel (PDSCH) through channel coding and modulation on the downlink data under the control of the scheduler 720 and the CA controller 710. The PHICH block 733 generates a Physical HARQ Indicator CHannel (PHICH) through channel coding and modulation on the HARQ-ACK/NACK corresponding to the uplink data under the control of the scheduler 720 and the CA controller 710.

The PDCCH, PDSCH, and PHICH generated by the PDCCH generator 731, the PDSCH generator 732, and the PHICH generator 733, respectively, are multiplexed by the multiplexer 734 and then processed by the RF transmitter 735 so as to be transmitted to the UE on the downlink frequency f1 of the macro eNB.

The reception unit 740 is capable of receiving signals on the uplink frequency f2' of the pico eNB which has joined carrier aggregation as well as the uplink frequency f1' of the macro eNB. The reception unit 740 receives radio signals by means of the RF receiver 744 and demultiplexes the received signal to at least one of the PUCCH receiver 741 and the PUSCH receiver 742.

The PUCCH receiver 741 performs demodulation and channel-decoding on the Physical Uplink Control CHannel (PUCCH) including UCI to acquire HARQ-ACK/NACK and CSI. The PUSCH receiver 742 performs demodulation and channel-decoding on the Physical Uplink Shared CHannel (PUSCH) to acquire the uplink data transmitted by the UE.

The reception unit 740 delivers the output from the PUSCH receiver 741 and the PUSCH receiver 742 to the scheduler 720 and the CA controller 710 for making scheduling and carrier aggregation decisions.

Figure 8:
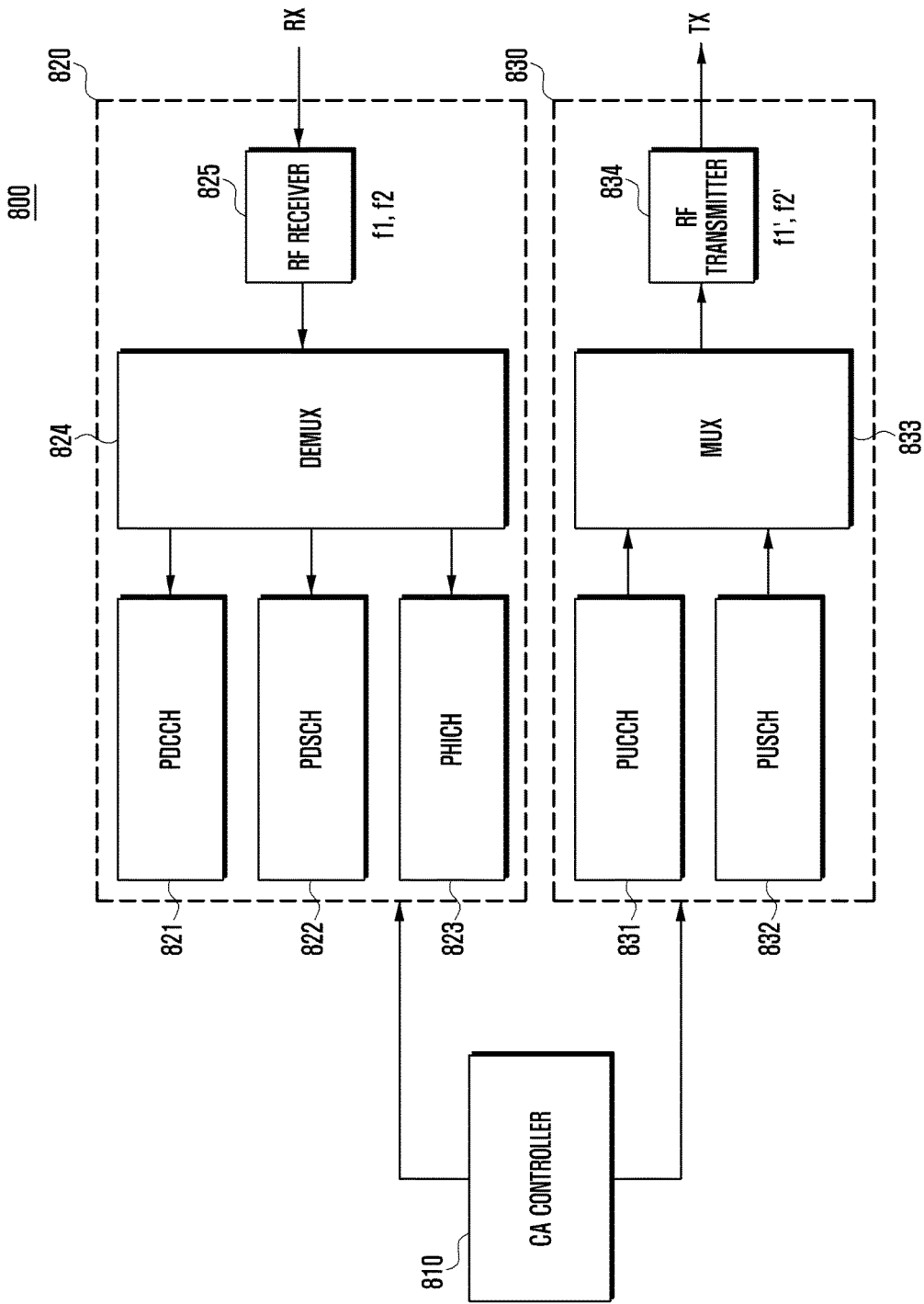
FIG. 8 is a block diagram illustrating the configuration of a UE according to an embodiment of the present invention.

FIG. 8 is a block diagram illustrating the configuration of the UE according to an embodiment of the present invention. The UE is capable of receiving signals on the downlink frequencies f1 and f2 and transmitting signals on the uplink frequencies f1' and f2'. Referring to FIG. 8, the UE 800 includes a CA controller 810, a reception unit 820 including a PDCCH receiver 821, a PDSCH receiver 822, a PHICH receiver 823, a demultiplexer 824, and an RF receiver 825; and a transmission unit 830 including a PUCCH transmitter 831, a PUSCH transmitter 832, a multiplexer 833, and an RF transmitter 834.

The CA controller 810 configures carrier aggregation of the UE and controls the reception unit 820 and the transmission unit 830 based on the control information transmitted by the eNB.

The PDCCH receiver 821 of the reception unit 820 performs demodulation and channel decoding on the PDCCH received through the downlink frequency f1 and/or f2 to acquire downlink control information. The PDSCH receiver 822 performs demodulation and channel-decoding on the PDSCH received through the downlink frequency f1 and/or f2 to acquire downlink data. The PHICH receiver 823 performs demodulation and channel-decoding on the PHICH received through downlink frequency f1 and/or f2 to acquire HARQ-ACK/NACK corresponding to the uplink data transmitted by the UE.

The PUCCH transmitter 831 of the transmission unit 830 generates a PUCCH by performing channel coding and modulation on UCI including HARQ-ACK/NACK and CSI addressed to the macro or pico eNB under the control of the CA controller 810. The PUSCH transmitter 832 generates a PUSCH by performing channel coding and modulation on the uplink data addressed to the macro or pico eNB under the control of the CA controller 810.

The PUCCH generated by the PUCCH transmitter 831 and the PUSCH generated by the PUSCH transmitter 832 are multiplexed by the multiplexer 833 and processed by the RF transmitter 834 such that the PUSCH is transmitted to the eNB through the uplink frequency f1' or f2' and the PUCCH is transmitted to the eNB through the uplink frequency f2'.

Although embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims and their equivalents.

What is claimed is:

1. A physical channel transmission method by a terminal in a communication system supporting carrier aggregation, the method comprising:

receiving configuration information including an uplink frequency for use in uplink control channel transmission from a network;

configuring a plurality of carriers for a first base station and a second base station according to the configuration information; and when a coverage area of the first base station to which the terminal has connected in an initial attach procedure is greater than a coverage area of the second base station which is added according to the configuration information, transmitting an uplink control channel, including a first uplink control information (UCI) of the first base station and a second UCI of the second base station, on the uplink frequency, based on transmit power control information transmitted by a base station with a highest transmit power among a plurality of base stations, wherein the uplink frequency is configured for the second base station, and the first base station is configured to receive and process a signal transmitted on the uplink frequency.

2. The method of claim 1, wherein the configuration information further comprises at least one of an uplink and a downlink frequency added in a carrier aggregation procedure, a transmission format of the uplink control channel, and a transmission resource of the uplink control channel.

3. The method of claim 1, wherein transmitting the uplink control channel comprises determining transmit power of the uplink control channel according to the transmit power control information.

4. The method of claim 1, wherein transmitting the uplink control channel comprises configuring, when the information indicates only downlink carrier aggregation, an uplink frequency for the uplink control channel transmission to the uplink frequency configured for the second base station.

5. A physical channel reception method by a first base station in a communication system supporting carrier aggregation, the method comprising:

establishing a connection with a terminal which requests an initial attach procedure;

transmitting configuration information including an uplink frequency for use in uplink control channel transmission to the terminal; and when a coverage area of the first base station to which the terminal has connected in an initial attach procedure is greater than a coverage area of the second base station which is added according to the configuration information, receiving an uplink control channel, including a first uplink control information (UCI) of a first base station and a second UCI of a second base station, from the terminal through the uplink frequency, wherein a plurality of carriers for the first base station and the second base station are configured by the terminal according to the configuration information, wherein the uplink frequency is configured for the second base station, and the first base station is configured to receive and process a signal transmitted on the uplink frequency, and wherein the uplink control channel is transmitted at a transmit power level determined according to transmit power control information transmitted by a base station with a highest transmit power among a plurality of base stations.

6. The method of claim 5, wherein the configuration information further comprises at least one of an uplink and a downlink frequency added in a carrier aggregation procedure, a transmission format of the uplink control channel, and a transmission resource of the uplink control channel.

7. The method of claim 5, wherein receiving the uplink control channel comprises configuring, when the configuration information indicates only downlink carrier aggregation, an uplink frequency for the uplink control channel reception to the uplink frequency configured for the second base station.

8. A terminal for transmitting a physical channel in a communication system supporting carrier aggregation, the terminal comprising:
a transceiver; and
a controller coupled with the transceiver and configured to control to:
receive configuration information including an uplink frequency for use in uplink control channel transmission from the network,
configure a plurality of carriers for a first base station and a second base station according to the configuration information, and
when a coverage area of the first base station to which the terminal has connected in an initial attach procedure is greater than a coverage area of the second base station which is added according to the configuration information, transmit an uplink control channel, including a first uplink control information (UCI) of the first base station and a second UCI of the second base station, on the uplink frequency, based on transmit power control information transmitted by a base station with a highest transmit power among a plurality of base stations,
wherein the uplink frequency is configured for the second base station, and the first base station is configured to receive and process a signal transmitted on the uplink frequency.

9. The terminal of claim 8, wherein the configuration information further comprises at least one of an uplink and a downlink frequency added in a carrier aggregation procedure, a transmission format of the uplink control channel, and a transmission resource of the uplink control channel.

10. The terminal of claim 8, wherein the controller is further configured to determine transmit power of the uplink control channel according to the transmit power control information.

11. The terminal of claim 8, wherein the controller is further configured to change, when the configuration information indicates only downlink carrier aggregation, an uplink frequency for the uplink control channel transmission to the uplink frequency configured for the second base station.

12. A first base station for receiving a physical channel in a communication system supporting carrier aggregation, the base station comprising:
a transceiver; and
a controller coupled with the transceiver and configured to control to:
establish a connection with the terminal which requests an initial attach procedure,
transmit configuration information including an uplink frequency for use in uplink control channel transmission to the terminal, and
when a coverage area of the first base station to which the terminal has connected in an initial attach procedure is greater than a coverage area of the second base station which is added according to the configuration information, receive an uplink control channel, including a first uplink control information (UCI) of a first base station and a second UCI of a second base station, from the terminal through the uplink frequency,
wherein a plurality of carriers for the first base station and the second base station are configured by the terminal according to the configuration information,
wherein the uplink frequency is configured for the second base station, and the first base station is configured to receive and process a signal transmitted on the uplink frequency, and
wherein the uplink control channel is transmitted at a transmit power level determined according to transmit power control information transmitted by a base station with a highest transmit power among a plurality of base stations.

13. The first base station of claim 12, wherein the configuration information further comprises at least one of an uplink and a downlink frequency added in a carrier aggregation procedure, a transmission format of the uplink control channel, and a transmission resource of the uplink control channel.

14. The first base station of claim 12, wherein the controller is further configured to change, when the configuration information indicates only downlink carrier aggregation, an uplink frequency for the uplink control channel reception to the uplink frequency configured for the second base station.

* * * * *